(12) United States Patent
Zukowski (10) Patent No.: US 6,980,087 B2
(45) Date of Patent: Dec. 27, 2005

(54) REUSABLE ELECTRONIC TAG FOR SECURE DATA ACCUMULATION

(75) Inventor: Deborra J. Zukowski, Newton, CT (US)

(73) Assignee: Pitney Bowes Inc., Stamford, CT (US)

( * ) Notice: Subject to any disclaimer, the term of this patent is extended or adjusted under 35 U.S.C. 154(b) by 244 days.

(21) Appl. No.: 10/454,446

(22) Filed: Jun. 4, 2003

(65) Prior Publication Data

US 2004/0246103 A1     Dec. 9, 2004

(51) Int. Cl.⁷ .................. H04Q 5/22; G05B 19/00; G06F 7/00; G08B 29/00; H04B 1/00
(52) U.S. Cl. ................. 340/10.51; 340/10.52; 340/5.21; 340/5.23; 713/200
(58) Field of Search .............. 340/10.51, 10.52, 340/5.8, 10.4, 5.5, 5.2; 713/200, 180, 186, 713/185; 705/18–69; 711/163, 164; 235/375–385

(56) References Cited

U.S. PATENT DOCUMENTS

| | | | | |
|---|---|---|---|---|
| 4,672,182 A | * | 6/1987 | Hirokawa | 235/436 |
| 4,985,920 A | * | 1/1991 | Seki | 713/193 |
| 5,257,011 A | * | 10/1993 | Beigel | 340/572.1 |
| 5,517,188 A | * | 5/1996 | Carroll et al. | 340/10.52 |
| 5,796,092 A | * | 8/1998 | Nagata et al. | 235/492 |
| 5,874,902 A | * | 2/1999 | Heinrich et al. | 340/10.51 |
| 5,966,082 A | * | 10/1999 | Cofino et al. | 340/10.51 |
| 5,974,500 A | * | 10/1999 | Maletsky et al. | 711/103 |
| 6,693,544 B1 | * | 2/2004 | Hebbecker | 340/573.1 |
| 6,753,759 B2 | * | 6/2004 | Stegmaier et al. | 340/10.51 |

* cited by examiner

*Primary Examiner*—Michael Horabik
*Assistant Examiner*—Nam Nguyen
(74) *Attorney, Agent, or Firm*—Ronald Reichman; Angelo Chaclas (57) ABSTRACT

A reusable electronic tag having a plurality of memory locations to allow a user to write information onto the tag. After a memory location is written, it becomes write-protected, preventing the written content from being altered or deleted by an unauthorized user. By granting a user access right to certain memory locations, it is possible to restrict the user's ability to access the memory location depending on the granted access type and the level of restriction set for the memory location. A user with a valid password is allowed to read and write a memory location. Such a user may be allowed to clear the memory locations so that the tag can be reused.

14 Claims, 7 Drawing Sheets

REUSABLE ELECTRONIC TAG FOR SECURE DATA ACCUMULATION

FIELD OF THE INVENTION

The present invention relates generally to an electronic tag and, more specifically, to a mobile, reusable electronic tag.

BACKGROUND OF THE INVENTION

When a mailpiece is sent by a sender to a recipient, it is useful to track the mailpiece to find out how the mailpiece is delivered, what route it takes and where and at what time the mailpiece is processed during transit. It is possible to use a radio frequency identification device (RFID) as a tag to be attached to a mailpiece to gather information en route. The RFID tag has a plurality of memory locations to allow the sender and some or all of the mailpiece handlers to write messages in the tag. For this application, one must ensure that data can be written as needed, and that the data written onto the tag remains indefinitely, if so desired. While tags that provide read/write data capability can be used to write data as needed, the data written onto the tag is not protected. That is, the data written onto the tag may be overwritten. One solution to this problem is to protect the written data by password such that only the person who has the password can overwrite the memory content. However, tags that are password-protected require the password to be disseminated to all possible writers—something that may be difficult to achieve.

Tags that can be written once or that have a locking capability such that data can be written as needed and that the data written onto them can remain indefinitely do exist. However, they cannot be reused.

Additionally, there may be a desire to protect the information from general read access, especially if the tag traverses competitive organizations, which the current tags do not address.

It is thus desirable and advantageous to provide a reusable memory device onto which data can be written as needed, and the written data can remain as long as desired.

SUMMARY OF THE INVENTION

It is a primary objective of the present invention to provide a reusable electronic tag having a plurality of memory locations to allow a user to write data onto the tag. The written data is protected in that an unauthorized user is not allowed to alter the written data. This objective can be achieved by granting a user access rights to a memory location based on whether the user has a valid password and whether the memory block has been written. Furthermore, the user's ability to access the memory location is dependent on the granted access type and the level of restriction set for the memory location, as summarized in the following table:

| User Access | Unrestricted Mode | Restricted Mode |
| --- | --- | --- |
| Open | User can write memory, mode changes to restricted afterward | User cannot write. May be able to read, based on how restrictive mode is. |
| Authorized | User can write memory, mode changes to restricted afterward | User can read/write/clear. If memory cleared, mode changes to unrestricted. |

As shown in the table, there are two access types: open and authorized. If the memory location is set in the unrestricted mode, the user's ability to access the memory location does not depend on whether or not the user is authorized. But, if the memory location is set at the restricted mode, only an authorized user can write or clear that memory location. Such user is allowed to clear the memory location so that the electronic tag can be reused.

When the user is granted with said first access type—open type, the user is only allowed to access the memory locations in a first operational mode—write unprotected mode.

When the user is granted with the first access type, the user is allowed to access the memory locations in a second operational mode—write protected mode, but only to read the information stored therein.

When the user is granted with the first access type, the user is allowed to cause only the memory locations in the first operational mode to store information supplied by the user and to cause said memory locations to change from the first operational mode to the second operational mode after said storing.

Thus, when the user is granted with the second access type—authorized type, the user is allowed to read stored information in said subset of memory locations regardless whether said memory locations are in the first operational mode or in the second operational mode.

Thus, when the user is granted the second access type, the user is allowed to alter stored information in at least some of the subset of memory locations in the second operational mode.

Thus, when the user is granted with the second access type, the user is allowed to delete stored information in at least some of the subset of memory locations in the second operational mode and to cause said memory locations to change from the second operational mode to the first operational mode after said deletion.

The present invention will become apparent upon reading the description taken in conjunction with FIGS. 1–9.

BEST MODE FOR CARRYING OUT THE INVENTION

Figure 1:
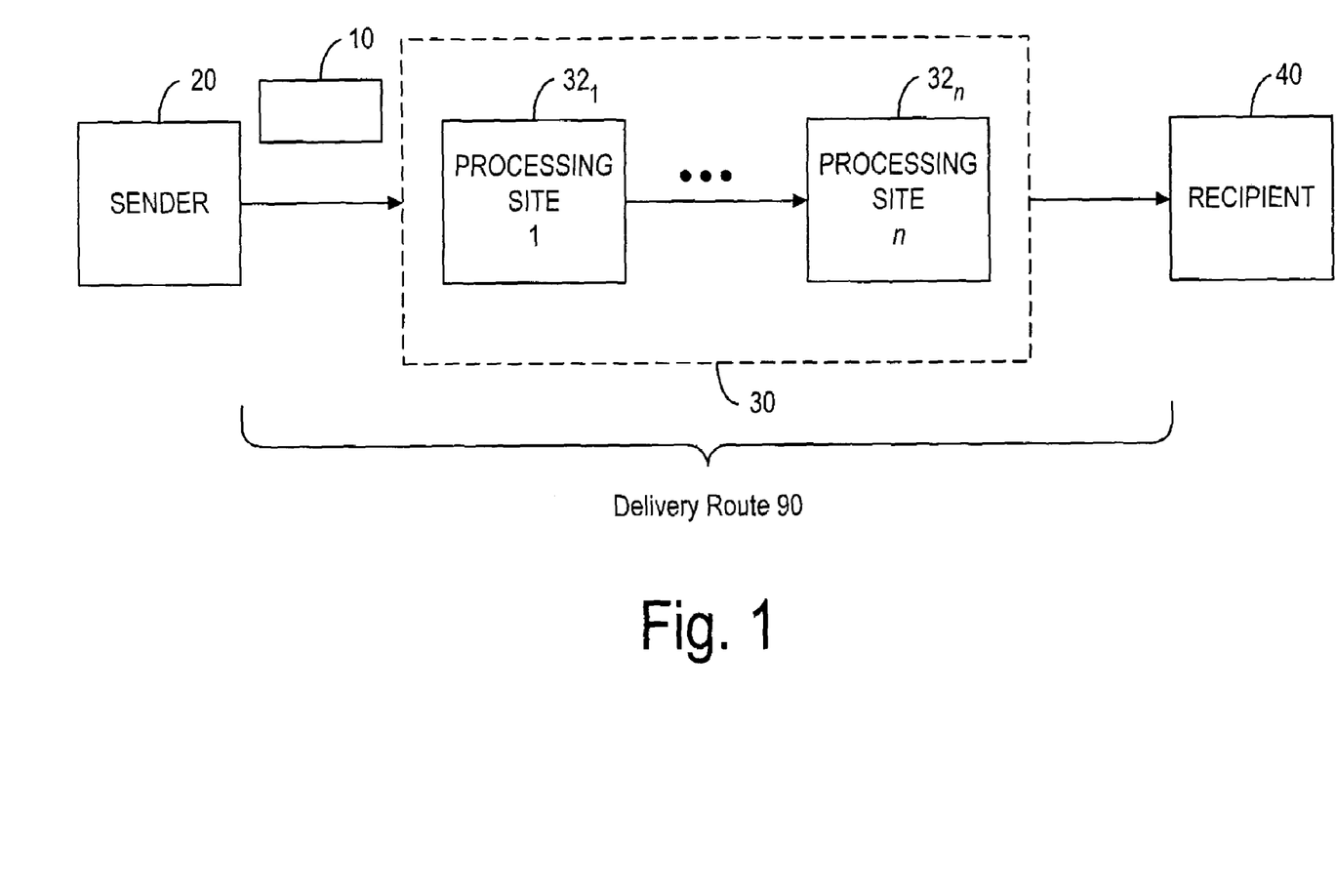
FIG. 1 is a schematic representation showing the delivery route of a mailpiece, between a sender and a recipient of the mailpiece.
Figure 2:
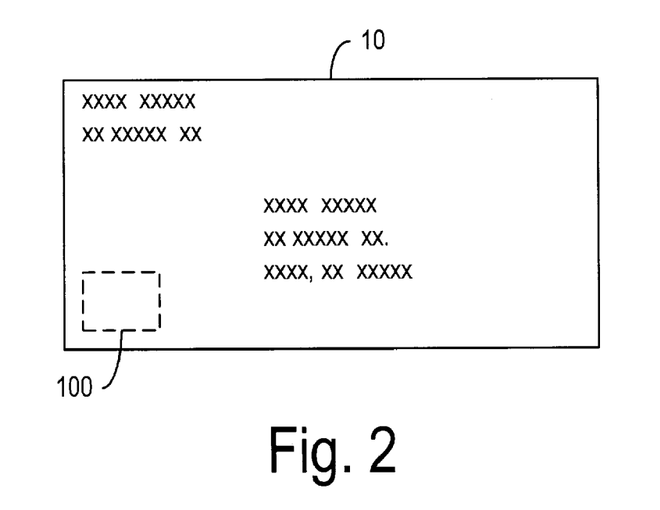
FIG. 2 is a schematic representation showing the mailpiece and the information gathering device, according to the present invention.
Figure 3A:
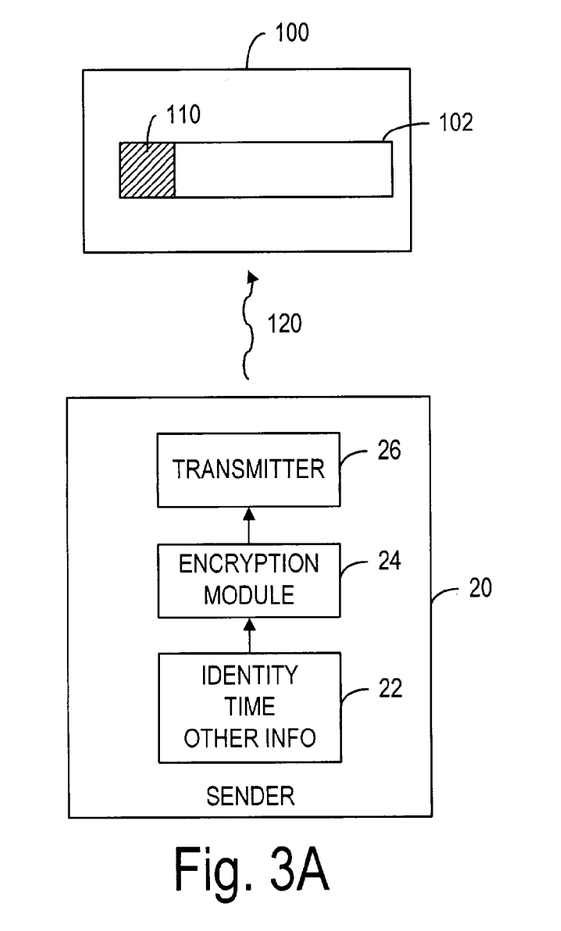
FIG. 3a is a schematic representation showing the identity of the sender and/or other information being stored in the device.

A mailpiece 10 is sent by a sender 20 to a recipient 40 via a certain courier 30. The courier 30 has a delivery route 90 defined by a plurality of mailpiece processing sites $32_1, 32_2, \ldots, 32_n$, as shown in FIG. 1. During transit, the mailpiece 10 is supposed to be processed by all of the processing sites. According to the present invention, an information gathering device 100 is provided in the mailpiece 10, as shown in FIG. 2, either inside or outside the mailpiece 10. The device 100 is capable of recording information provided by the sender and information provided by the processing sites. As shown in FIG. 3a, the sender 20 has a transmitter 26 capable of sending signals 120 to the information gathering device 100. As shown, the device 100 has a memory unit 102 for storing the information 110 contained in the signals 120 provided by the sender. For example, the signals 120 contain data 22 indicative of the sender identity or other information the sender wishes to convey to the recipient. Preferably, the sender's identity is encrypted by an encryption module 24 such that only an authorized party can decipher the encrypted information. The sender's identity contained in the signals 120 can be a personal signature. The means for providing a personal signature is well known in the art, and may include the use of public key encryption. In addition, it may be desirable that the stored information 110 also contains the time of sending the mailpiece by the sender.

Figure 3B:
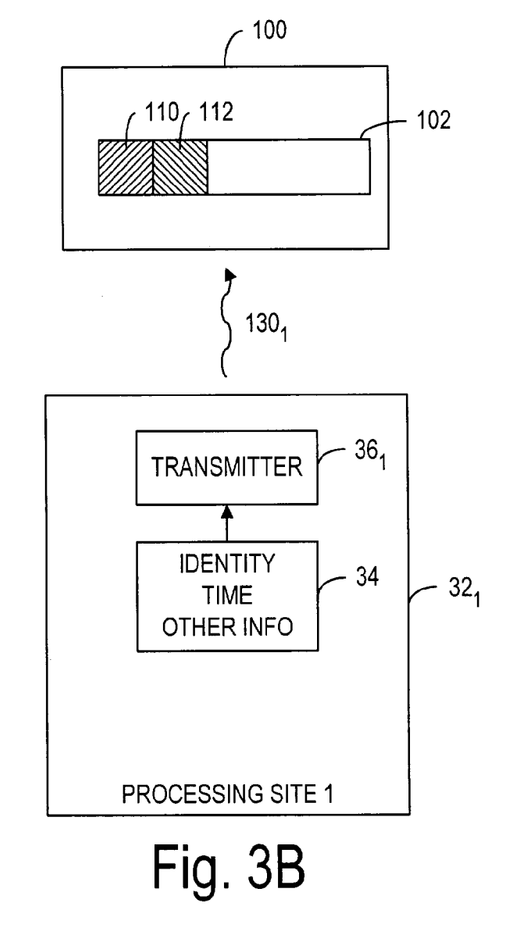
FIG. 3b is a schematic representation showing the identity of a processing site and/or other information being stored in the device when the mailpiece is processed by the processing site.
Figure 4:
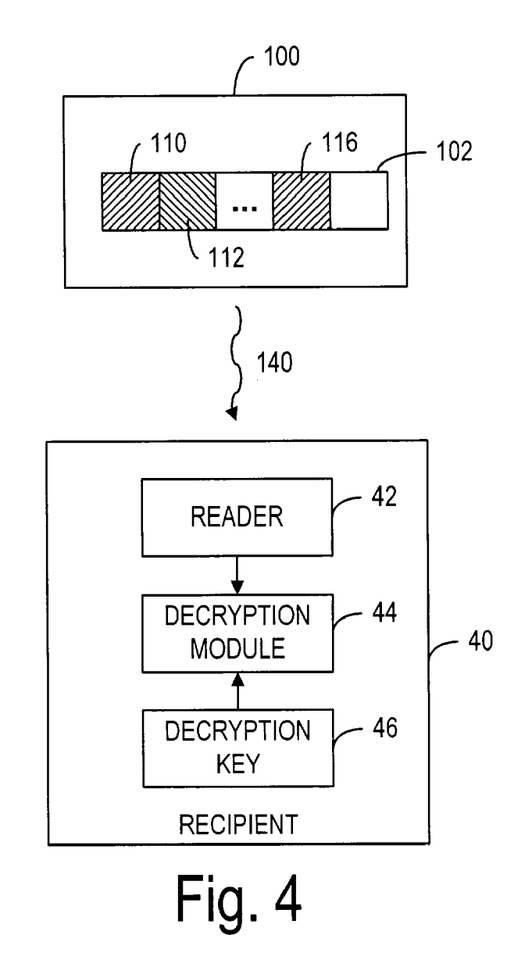
FIG. 4 is a schematic representation showing the stored information in the device being read by the recipient or other involved individual.

When the mailpiece 10 is delivered to the recipient 40, the recipient 40 can read the stored information 110 from the memory 102 of the device 100, as shown in FIG. 4, in order to retrieve the personal signature of the sender. While the signature provides the recipient with verification that the item was originated by the sender, the item may become unsafe as it processes through various processing sites in the mail stream because of biohazard contamination, for example. The recipient may reject the item unless some evidence of its route is also provided. For this level of verification, the processing sites $32_1, 32_2, \ldots, 32_n$ provide a service for encoding site and time information onto the device 100. For example, when the mailpiece 10 is processed by the processing site $32_1$, it receives a signal $130_1$ provided by the processing site $32_1$ via a transmitter $26_1$, as shown in FIG. 3b. The signals $130_1$ contain data 34 indicative of the identity of the processing site $32_1$ and the time the mail piece is processed at the processing site $32_1$. This recorded information indicative of the data 34 is denoted by reference numeral 112. However, any information provided in during transit should be protected in that the information will not be overwritten. Additionally, among the processing sites $32_1, 32_2, \ldots, 32_n$, there may be competitors. Thus, some of the processing sites may not want the information visible by other processing sites. For that reason, the encoding service is provided only for specialized tags that provide read protection to this information.

Upon receiving the mailpiece 10, the recipient 40 can retrieve the stored information 110, 112, . . . , stored in the memory 102 of the device 100. As shown in FIG. 4, the recipient 40 has a reader 42 for reading the content in the memory 102 via a signal 140. Preferably, the recipient has a key 46 to decrypt encrypted information using a decryption module 44. Based on the retrieved information, the recipient can verify the identity of the sender, the identity of each of the mail processing sites in the delivery route, and the time information. Thus, the recipient can determine whether it is safe to accept the mailpiece.

Figure 5:
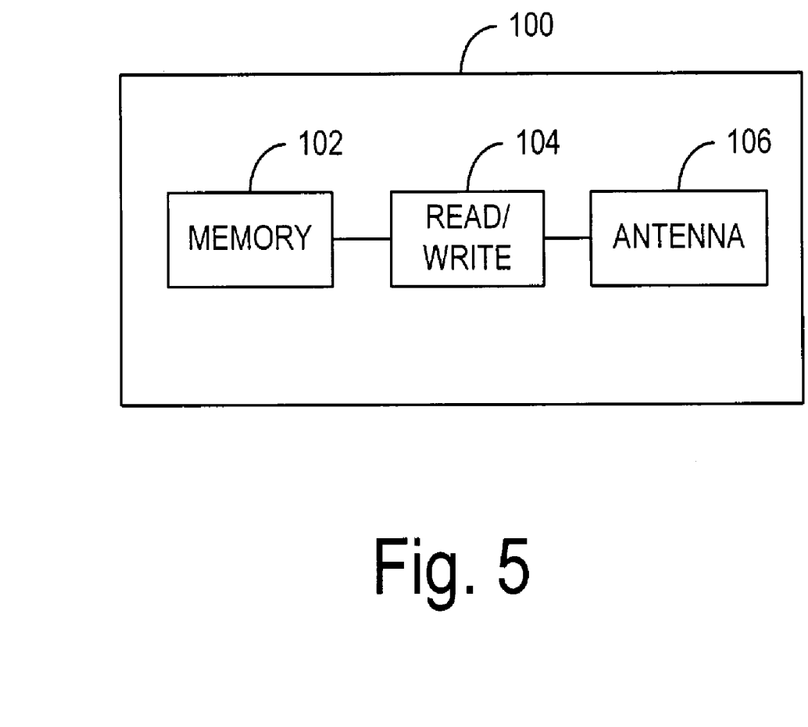
FIG. 5 is a block diagram showing the components of the information gathering device.

Preferably, the information gathering device 100 is an electronic device which is capable of electronically recording information and electronically releasing information. For example, the information gathering device 100 can be a radio frequency identification device (RFID) or tag. Typically, an RFID comprises a memory unit 102, a read/write module 104, and an antenna 106, as shown in FIG. 5. The antenna 106 is operatively connected to the read/write module 104 so as to convey signals 120, 130 to the read/write module 104 for writing data in the memory unit 102, and to transmit signals 140 containing data read from the memory unit 102. The signals 120, 130 and 140 are radio frequency signals. An RFID can be an active device, which contains a battery to power the device components, or it can be a passive device in that it is powered by an external device by means of inductive coupling. RFID's are known in the art. A major advantage of using an RFID as an information gathering device is that the device can be disposed inside the mailpiece for concealment or protection purposes.

While an RFID is a preferred device for information gathering, it is also possible to use an electronic device that receives and transmits optical signals, instead of radio frequency signals.

Advantageously, the recorded information on the device 100 remains with the mailpiece during transit. That is, the recorded information is not overwritten by any of the processing sites $32_j$. Additionally, should the mailpiece pass through a competitor site, the courier 30 may wish that the recorded information not be available to the competitor. The recorded information can be encoded in such a way that the recorded information is protected against unauthorized reading and against being overwritten, tampered or erased by an unauthorized party.

In a preferred embodiment of the present invention, the device 100 uses a special password-protected read/write memory 102. This memory includes the use of a bit array, 1 bit per memory block, for example, to determine whether a memory block has been written to. If a block has been written to, the associated bit is set. Two levels of protection can be achieved: write protection and full access protection. For write protection, the memory block can be written if the associated bit is clear, even by an unauthorized party who does not posses the password. However, once the associated bit is set after the block has been written, the bit disables all writes to the block unless a password is provided. For full access protection, the bit also disables reads if the bit has been set.

Figure 6:
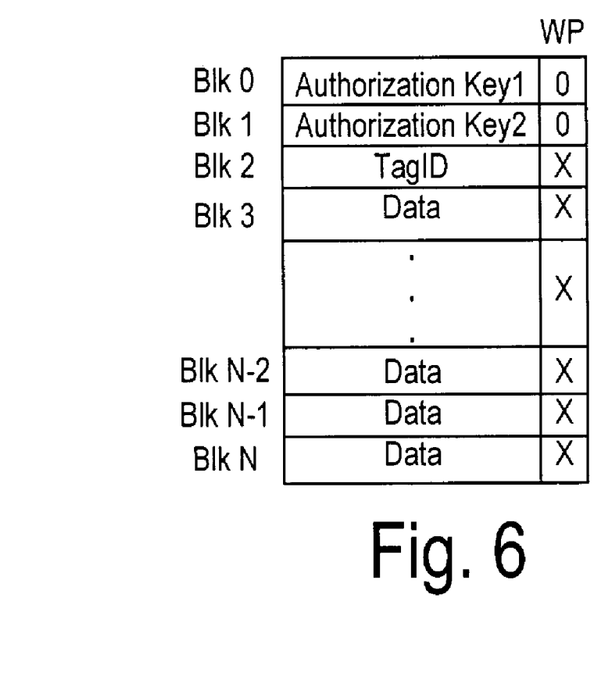
FIG. 6 is a table showing an exemplary allocation of memory in the information gathering device.

To illustrate how stored information can be protected, FIG. 6 shows the allocation of memory. As shown, the first two memory blocks are reserved for setting the tag's password and for holding the passwords that are provided in order to access the data. For these purposes, the third block includes a tag ID that can be used with a database system to store tag passwords for future use. The tag ID can also be used to specify a tag type. For example, if the tag is a strict type, a user without a password is only allowed to write a memory block if that memory block has not been written. In a cooperative tag type, a user without a password is allowed to read the data in a memory block even when the memory block has been written by another user. The rest of the memory blocks can be used to accumulate data as the tag moves along the delivery route and the mailpiece is processed by the processing sites. In FIG. 6, the access bits are shown for each word. These bits are called WP (for Written and Protect). The WP flag for memory block 0 is ignored and so it can be set to 0. The WP flag for memory block 1 (the user supplied password) must be "tied" to 0. As this location can be written by anyone who has access to the password, that person also has the authorization to read the information.

Figure 7:
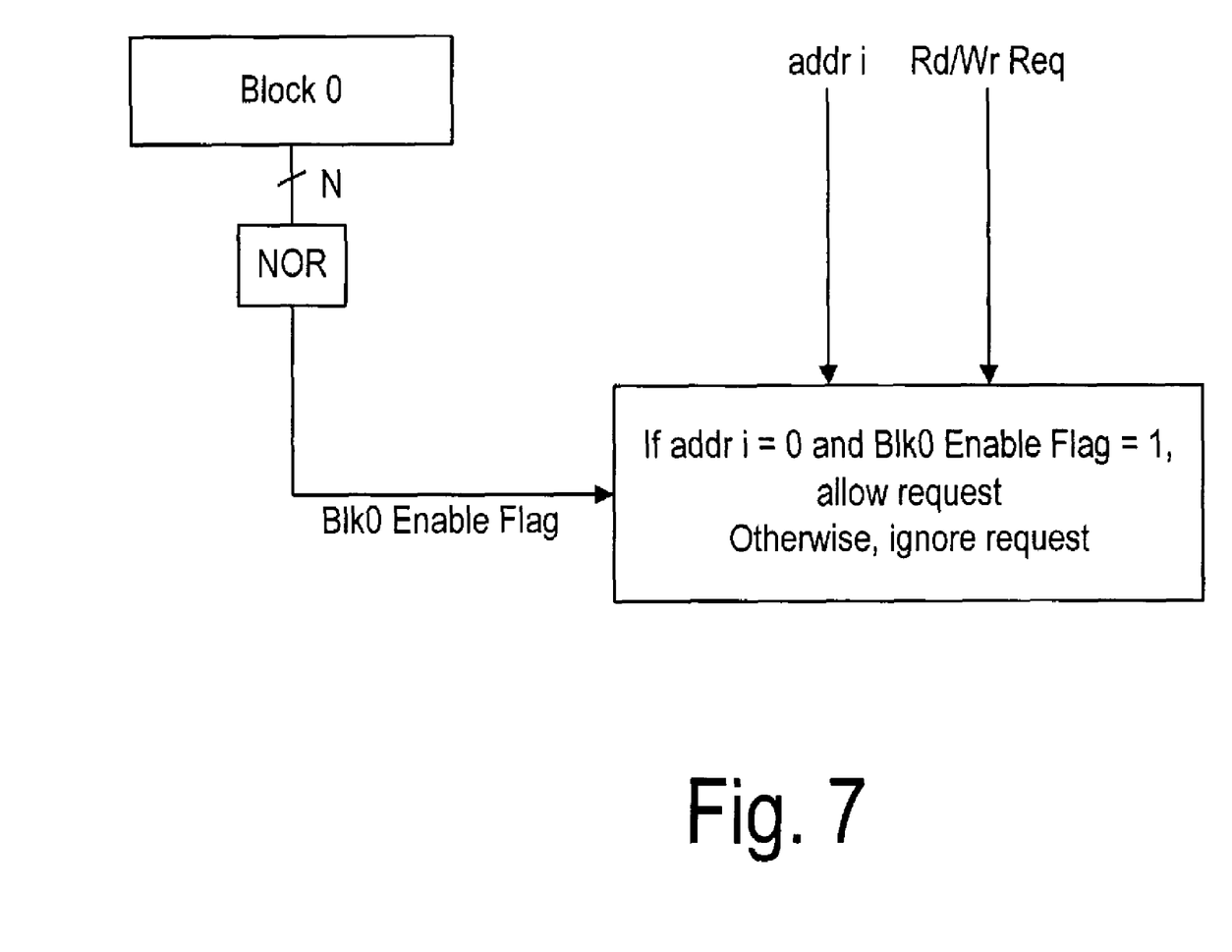
FIG. 7 is a block diagram showing an exemplary circuit for encoding the information gathering device with a secure password.

The password is carried securely on the tag. Once the memory block for storing the password is written, it is no longer available for reading or further writing. This memory block is only used as a control circuit to determine whether a password entered by a user is the same as the written password. FIG. 7 is an exemplary circuit that allows the tag to be encoded with a secure password. As shown, the password is held in memory block 0, which has been initialized at the factory, for example, to 0's. Accordingly, access of memory block 0 is allowed only when all bits are 0. Thus, once a password has been written to the block (a password of all zeros is not allowed), the block can no longer be written or read.

Figure 8A:
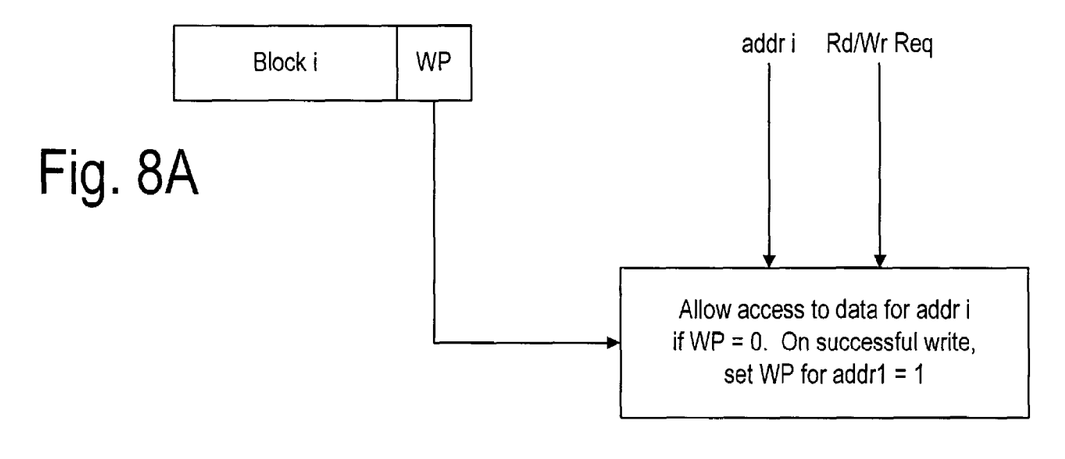
FIG. 8a is a block diagram showing one method of writing the memory block.
Figure 8B:
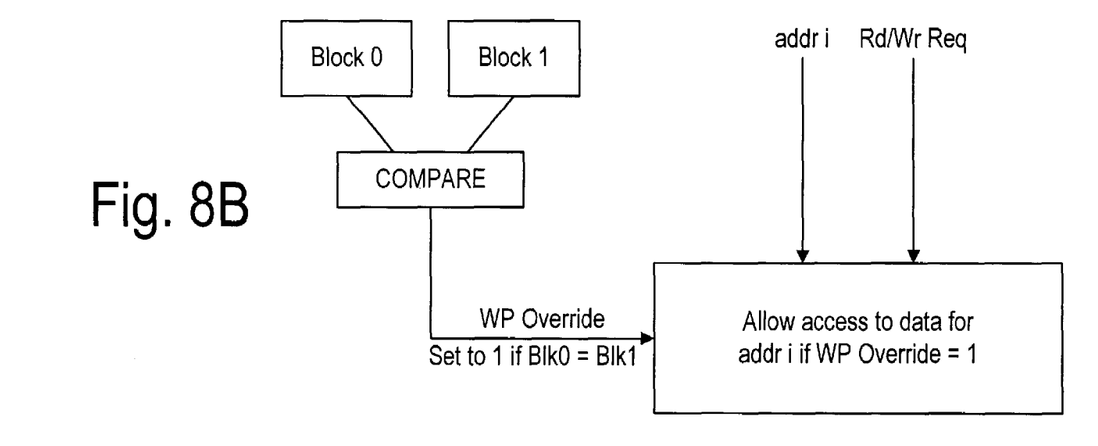
FIG. 8b is a block diagram showing another method of writing the memory block.

Other memory blocks can be written in two ways. In one way, the block can be written if its WP flag is not set, as shown in FIG. 8a. Once the flag is set, writes and reads (if so protected) are disabled. In the other way, the blocks can be written only after a password is written into memory block 1. If the password written to memory block 1 matches the tag password, as provided in memory block 0, then the WP flag is ignored and the access is allowed, as shown in FIG. 8b.

When the mailpiece 10 is delivered to the recipient 40, the information gathering device 100 (the tag) will supply the sender's signature and the identity of each of the processing sites in the delivery route. The recipient needs to read this information from the device 100. If the tag protects the information from both writes and reads, the recipient 40 needs to obtain the password to the sender 20, using a standard password distribution technique. Such techniques are known in the art. The tag can be cleared for reuse by the recipient or the sender, if so desired.

With the device 100 as described above, it is possible to grant a user access rights to a memory block based on whether the user has a valid password and whether the memory block is write-protected. As shown in the flowchart 200 of FIG. 9, when a user makes a request to access the memory block of the device 100 at step 210, the device 100 determines at step 220 whether a valid password is provided. If the valid password is not provided, then the user will be granted only some limited access rights to a memory block based on whether the memory block is write-protected. Thus, at step 230, it is determined whether the write-protection flag WP=1 or 0. If WP=0, the user is granted a less restricted access right at step 240. Otherwise, the user is granted a more restricted access right at step 242. The less-restricted access right may include the right to write information onto the memory block. The more-restricted access right may include the right to read the information written onto the memory block. The user with the more-restricted access right is not allowed to overwrite the memory block or to delete the data contained therein. With a certain memory device, the user may be denied access if he or she does not have a valid password and WP=1.

Figure 9:
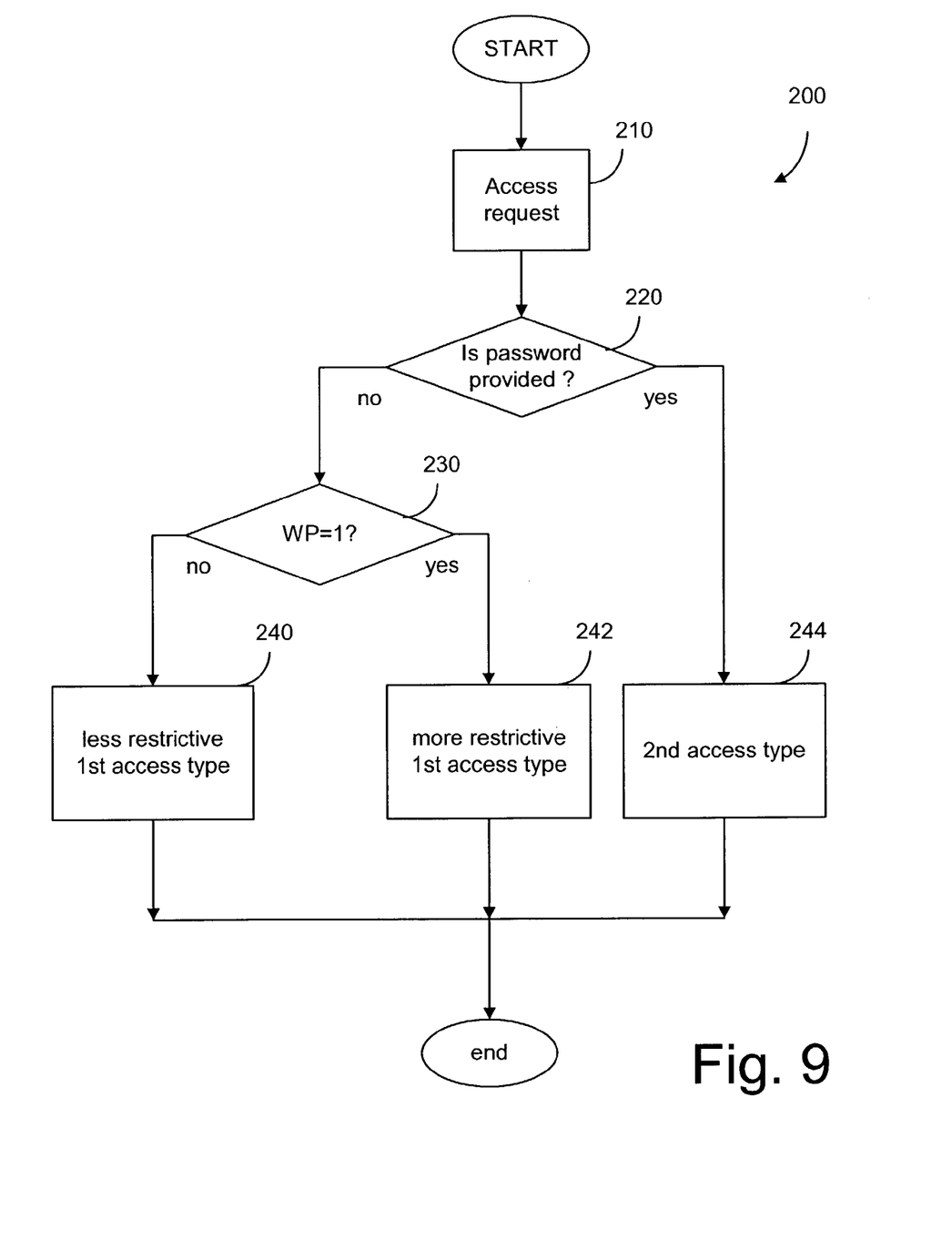
FIG. 9 is a flowchart illustrating the method of determining access rights to the memory blocks, according to the present invention.

If a valid password is provided, the user is granted a different type of access rights at step 244. In this case, the user could be the sender and the user may be allowed to write the memory block, to alter the contents in the memory block, and to clear the memory block so that the device 100 can be reused. However, the user may be the recipient of the mailpiece or a certain individual in the mail stream.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method of determining access rights of a user of a reusable mobile electronic tag, the electronic tag containing a plurality of memory locations capable of storing information, wherein at least a subset of said plurality of memory locations are able to store user-supplied information, said subset of memory locations operable in a first operational mode or in a second operational mode, and wherein for said subset of memory locations user access can be of two forms, a first access form and a second access form, wherein the reusable mobile electronic tag determines the first or second access form of the user, comprising the steps of:

storing an identification password in said electronic tag;
allowing the user to present a password to the electronic tag;
comparing within the electronic tag the password presented by the user to the identification password stored in the electronic tag;
if
the password presented by the user matches the identification password, then
granting the user with said second access form, otherwise
granting the user with said first access form; and
allowing the user to access the subset of memory locations within the electronic tag to an extent enabled by said first or second access form granted to said user, so that when the memory locations are in the first operational mode the user is granted said first access form and when the memory locations are in the second operational mode the user is granted said second access form, wherein when the user is granted with said first access form, the user is allowed to cause only the memory locations in the first operational mode to store information supplied by the user and to cause said memory locations to change from the first operational mode to the second operational mode after said storing.

2. The method of claim 1, wherein when the user is granted with said first access type, the user is only allowed to access the memory locations in the first operational mode.

3. The method of claim 1, wherein when the user is granted with said first access type, the user is allowed to access the memory locations in the second operational mode, but only to read the information stored therein.

4. The method of claim 1, wherein when the user is granted with said second access type, the user is allowed to read stored information in said subset of memory locations regardless whether said memory locations are in the first operational mode or in the second operational mode.

5. The method of claim 1, wherein when the user is granted with said second access type, the user is allowed to alter stored information in at least some of said subset of memory locations in the second operational mode.

6. The method of claim 1, wherein the first operational mode is a write unprotected mode.

7. The method of claim 1, wherein the second operational mode is a write protected mode.

8. A method of determining access rights of a user of a reusable mobile electronic tag, the electronic tag containing a plurality of memory locations capable of storing information, wherein at least a subset of said plurality of memory locations are able to store user-supplied information, said subset of memory locations operable in a first operational mode or in a second operational mode, and wherein for said subset of memory locations user access can be of two forms, a first access form and a second access form, wherein the reusable mobile electronic tag determines the first or second access form of the user, comprising the steps of:

storing an identification password in said electronic tag;

allowing the user to present a password to the electronic tag;

comparing within the electronic tag the password presented by the user to the identification password stored in the electronic tag;

if the password presented by the user matches the identification password, then granting the user with said second access form, otherwise granting the user with said first access form; and allowing the user to access the subset of memory locations within the electronic tag to an extent enabled by said first or second access form granted to said user, so that when the memory locations are in the first operational mode, the user is granted said first access form and when the memory locations are in the second operational mode the user is granted said second access form, wherein when the user is granted with said second access form, the user is allowed to delete stored information in at least some of said subset of memory locations in the second operational mode and to cause said memory locations to change from the second operational mode to the first operational mode after said deletion.

9. The method of claim 8, wherein when the user is granted with said first access type, the user is only allowed to access the memory locations in the first operational mode.

10. The method of claim 8, wherein when the user is granted with said first access type, the user is allowed to access the memory locations in the second operational mode, but only to read the information stored therein.

11. The method of claim 8, wherein when the user is granted with said second access type, the user is allowed to read stored information in said subset of memory locations regardless whether said memory locations are in the first operational mode or in the second operational mode.

12. The method of claim 8, wherein when the user is granted with said second access type, the user is allowed to alter stored information in at least some of said subset of memory locations in the second operational mode.

13. The method of claim 8, wherein the first operational mode is a write unprotected mode.

14. The method of claim 8, wherein the second operational mode is a write protected mode.

* * * * *